(12) United States Patent
Konet et al.

(10) Patent No.: US 8,878,660 B2
(45) Date of Patent: Nov. 4, 2014

(54) VEHICLE METER CLUSTER

(75) Inventors: Heather Konet, Canton, MI (US); Roy Goudy, Farmington Hills, MI (US); Jeremy Chambers, Casco, MI (US); Andy Christensen, Livonia, MI (US); John Combest, Farmington Hills, MI (US); Jim Grabow, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 332 days.

(21) Appl. No.: 13/170,560

(22) Filed: Jun. 28, 2011

(65) Prior Publication Data

US 2013/0002414 A1    Jan. 3, 2013

(51) Int. Cl.
*B60Q 1/00*    (2006.01)
*B60K 37/06*   (2006.01)
*B60Q 9/00*    (2006.01)

(52) U.S. Cl.
CPC ............. *B60K 37/06* (2013.01); *B60Q 9/008* (2013.01); *B60K 2350/1064* (2013.01); *B60K 2350/1072* (2013.01); *B60K 2350/2052* (2013.01); *B60K 2350/2056* (2013.01); *B60K 2350/2086* (2013.01); *B60K 2350/2095* (2013.01); *B60K 2350/965* (2013.01)
USPC ........................................ 340/438; 362/23.01

(58) Field of Classification Search
CPC ........... B60Q 9/008; B60K 2350/1072; B60K 2350/965; B60K 2350/2056; B60K 2350/2086; B60K 2350/2095; B60K 2350/1064; B60K 2350/2052; B60K 37/06
USPC ........................................................ 362/23.01
See application file for complete search history.

(56) References Cited

U.S. PATENT DOCUMENTS

| | | | |
|---|---|---|---|
| 5,181,012 A * | 1/1993 | Furuya et al. | 340/461 |
| 5,305,011 A | 4/1994 | Furuya et al. | |
| 5,361,165 A * | 11/1994 | Stringfellow et al. | 359/631 |
| 5,606,337 A | 2/1997 | Lloyd | |
| 5,786,772 A | 7/1998 | Schofield et al. | |
| 5,929,786 A | 7/1999 | Schofield et al. | |
| 6,128,576 A | 10/2000 | Nishimoto et al. | |
| 6,211,778 B1 | 4/2001 | Reeves | |
| 6,317,037 B1 * | 11/2001 | Ayres et al. | 340/461 |
| 6,363,326 B1 | 3/2002 | Scully | |
| 6,414,796 B1 | 7/2002 | Muromachi et al. | |
| 6,534,152 B2 | 3/2003 | Freeman | |
| 6,727,808 B1 | 4/2004 | Uselmann et al. | |
| 6,744,353 B2 | 6/2004 | Sjonell | |
| 6,750,832 B1 | 6/2004 | Kleinschmidt | |
| 6,894,608 B1 | 5/2005 | Gunderson | |

(Continued)

FOREIGN PATENT DOCUMENTS

| | | |
|---|---|---|
| DE | 10 2004 042 107 A1 | 3/2006 |
| DE | 10 2009 003 433 A1 | 8/2009 |
| WO | WO-2010/051428 A1 | 5/2010 |

*Primary Examiner* — Hai Phan
*Assistant Examiner* — Ojiako Nwugo
(74) *Attorney, Agent, or Firm* — Global IP Counselors, LLP

(57) ABSTRACT

A vehicle meter cluster basically includes a meter cluster housing, an instrument display, a lens and a light source. The lens is disposed in front of the instrument display and includes a reflective area. The light source is mounted on the meter cluster housing or proximate to the meter cluster housing. The light source is configured to selectively emit light toward the reflective area of the lens to selectively provide warning information on the reflective area.

21 Claims, 10 Drawing Sheets

(56) References Cited

U.S. PATENT DOCUMENTS

| | | |
|---|---|---|
| 6,906,619 B2 | 6/2005 | Williams et al. |
| 6,914,521 B2 | 7/2005 | Rothkop |
| 6,933,837 B2 | 8/2005 | Gunderson et al. |
| 6,974,414 B2 | 12/2005 | Victor |
| 7,034,668 B2 | 4/2006 | Engelman et al. |
| 7,034,778 B1 | 4/2006 | Hahl |
| 7,095,562 B1 | 8/2006 | Peng et al. |
| 7,158,051 B2 | 1/2007 | Strumolo et al. |
| 7,161,472 B2 | 1/2007 | Strumolo et al. |
| 7,194,347 B2 | 3/2007 | Harumoto et al. |
| 7,215,254 B2 | 5/2007 | Tauchi |
| 7,274,287 B2 | 9/2007 | Dobler et al. |
| 7,365,641 B2 | 4/2008 | Nou |
| 7,387,397 B2 | 6/2008 | Konet et al. |
| 7,427,929 B2 | 9/2008 | Bauer et al. |
| 7,432,800 B2 | 10/2008 | Harter, Jr. et al. |
| 7,444,240 B2 | 10/2008 | Macneille et al. |
| 7,486,199 B2 | 2/2009 | Tengler et al. |
| 7,496,439 B2 | 2/2009 | McCormick |
| 7,532,130 B2 | 5/2009 | Curtis |
| 7,554,435 B2 | 6/2009 | Tengler et al. |
| 7,639,148 B2 | 12/2009 | Victor |
| 7,680,592 B2 | 3/2010 | Ikeda |
| 7,783,403 B2 | 8/2010 | Breed |
| 7,796,081 B2 | 9/2010 | Breed |
| 7,821,381 B2 | 10/2010 | Curtis |
| 7,847,678 B2 | 12/2010 | Kawamata et al. |
| 7,852,233 B2 | 12/2010 | Cemper |
| 7,876,203 B2 | 1/2011 | Traylor et al. |
| 7,898,432 B2 | 3/2011 | McNew et al. |
| 2001/0008992 A1 | 7/2001 | Saito et al. |
| 2003/0234720 A1 | 12/2003 | MacNeille et al. |
| 2004/0090317 A1 | 5/2004 | Rothkop |
| 2004/0178890 A1 | 9/2004 | Williams et al. |
| 2004/0246112 A1 | 12/2004 | Strumolo et al. |
| 2005/0073433 A1 | 4/2005 | Gunderson et al. |
| 2005/0286133 A1* | 12/2005 | Lipton .................... 359/619 |
| 2006/0087826 A1* | 4/2006 | Anderson ................ 362/23 |
| 2006/0109095 A1 | 5/2006 | Tankata et al. |
| 2008/0012697 A1 | 1/2008 | Smith et al. |
| 2009/0121853 A1* | 5/2009 | Eich et al. .................. 340/438 |
| 2009/0198445 A1 | 8/2009 | Miller et al. |
| 2010/0123778 A1 | 5/2010 | Hada |
| 2010/0135000 A1* | 6/2010 | Smith et al. .................. 362/20 |
| 2010/0214085 A1 | 8/2010 | Avery et al. |
| 2011/0084852 A1* | 4/2011 | Szczerba ................ 340/905 |
| 2011/0234442 A1* | 9/2011 | Batten et al. ................ 342/20 |
| 2012/0116663 A1* | 5/2012 | Tsunekawa ................ 701/300 |
| 2012/0218124 A1* | 8/2012 | Lee et al. .................... 340/904 |
| 2013/0076503 A1* | 3/2013 | Ishii et al. .................. 340/458 |

* cited by examiner

VEHICLE METER CLUSTER

BACKGROUND

1. Field of the Invention

The present invention generally relates to a vehicle meter cluster. More specifically, the present invention relates to a vehicle meter cluster that is configured to selectively provide warning information on a reflective area of a lens covering a meter display.

2. Background Information

Vehicles are becoming more sophisticated in their sensory capabilities, such as the capability to sense a potential collision, the direction in which the vehicle is turning and so on. Also, such vehicles are capable of presenting information pertaining to the sensed characteristics to a driver in a more detailed and effective manner. For example, a vehicle can include an active safety system that actively senses potential collisions and provide appropriate warnings to a driver and passengers in the form of audio, visual and/or haptic feedback. However, the placement and presentation of visual warnings pose many challenges in vehicles.

For instance, the visual warning indicators should be positioned where they can be quickly perceived and understood by a driver without being overwhelming to the driver. Preferably, the visual warning indicators should be placed within the driver's normal field of vision. However, finding space to package such a visual indicator appropriately in a vehicle can be particularly challenging. The instrument meter cluster, for example, already includes dense amounts of information. Thus, if the visual warning is presented at the instrument meter cluster, the visual warning may blend with the other non-emergency information and not properly received by the driver. Alternatively, the visual warnings can be presented at the A-pillars or headliners of the vehicle. However, it can be difficult to accommodate both the warning apparatus and airbag components in those types of locations.

Several original equipment manufacturers (OEMs) have incorporated heads-up displays (HUDs) in vehicles to present a display on the windshield in front of the driver. HUDs can be easily perceivable and understandable. However, the inclusion of another LCD display in the vehicle can be expensive. Also, the directing of light to the vehicle windshield is regulated heavily by some states which prohibit the use of non-functional lights (headlights, etc.) that can be visible outside of the vehicle or the flashing of lights on a non-emergency vehicle. Finally, the light from HUDs may be too dim to be properly perceived, especially when the driver is wearing polarized sunglasses.

SUMMARY

In view of the state of the known technology, one aspect of the present invention is to provide a vehicle meter cluster comprising a meter cluster housing, an instrument display, a lens and a light source. The lens is disposed in front of the instrument display and includes a reflective area. The light source is mounted on the meter cluster housing or proximate to the meter cluster housing. The light source is configured to selectively emit light toward the reflective area of the lens to selectively provide warning information on the reflective area.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
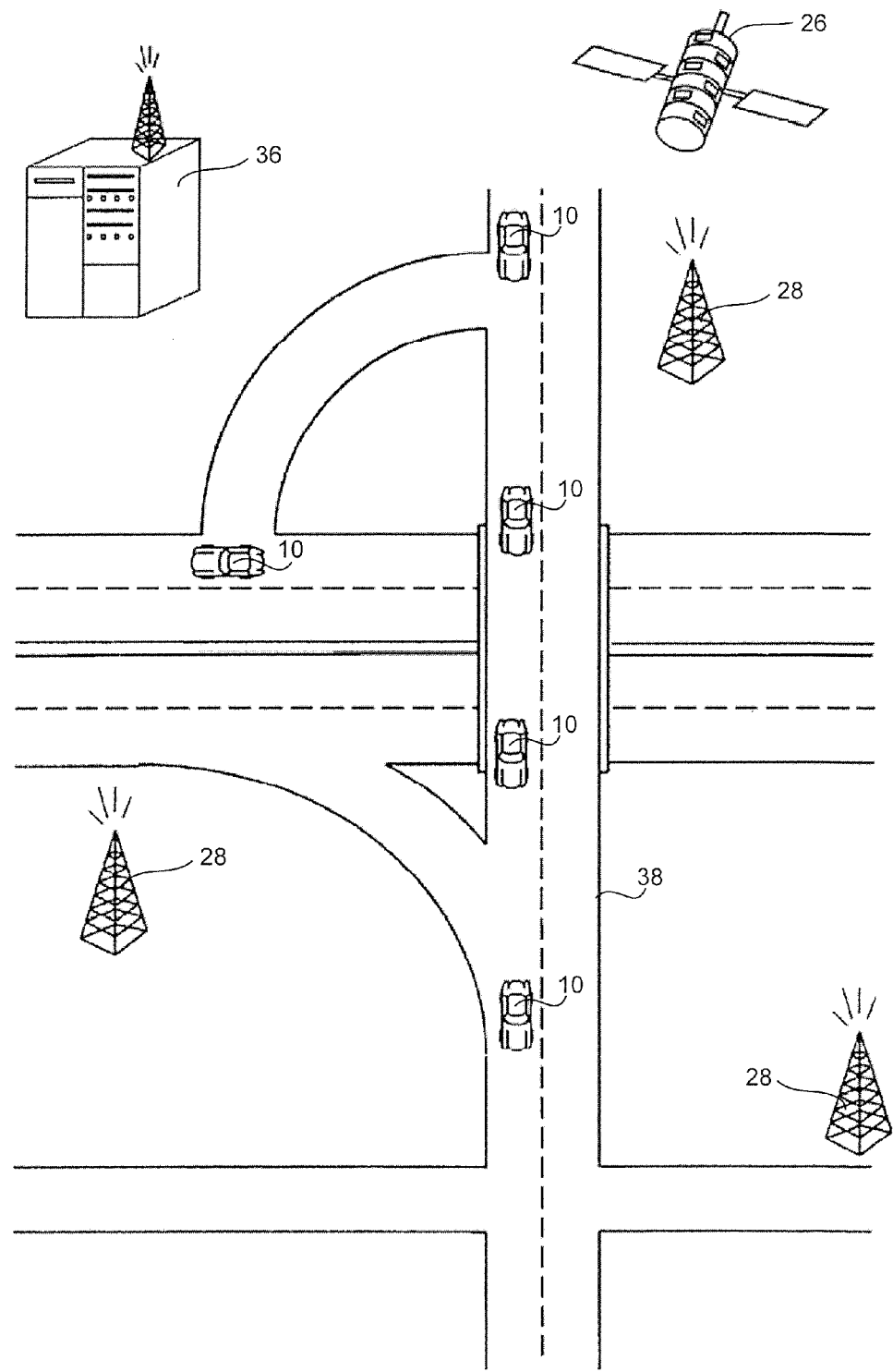
FIG. 1 is a pictorial representation of a two-way wireless communications network showing several vehicles equipped with an on-board unit capable of conducting two-way wireless communications with each other, as well as a vehicle collision warning system and vehicle meter cluster according to a disclosed embodiment.
Figure 2:
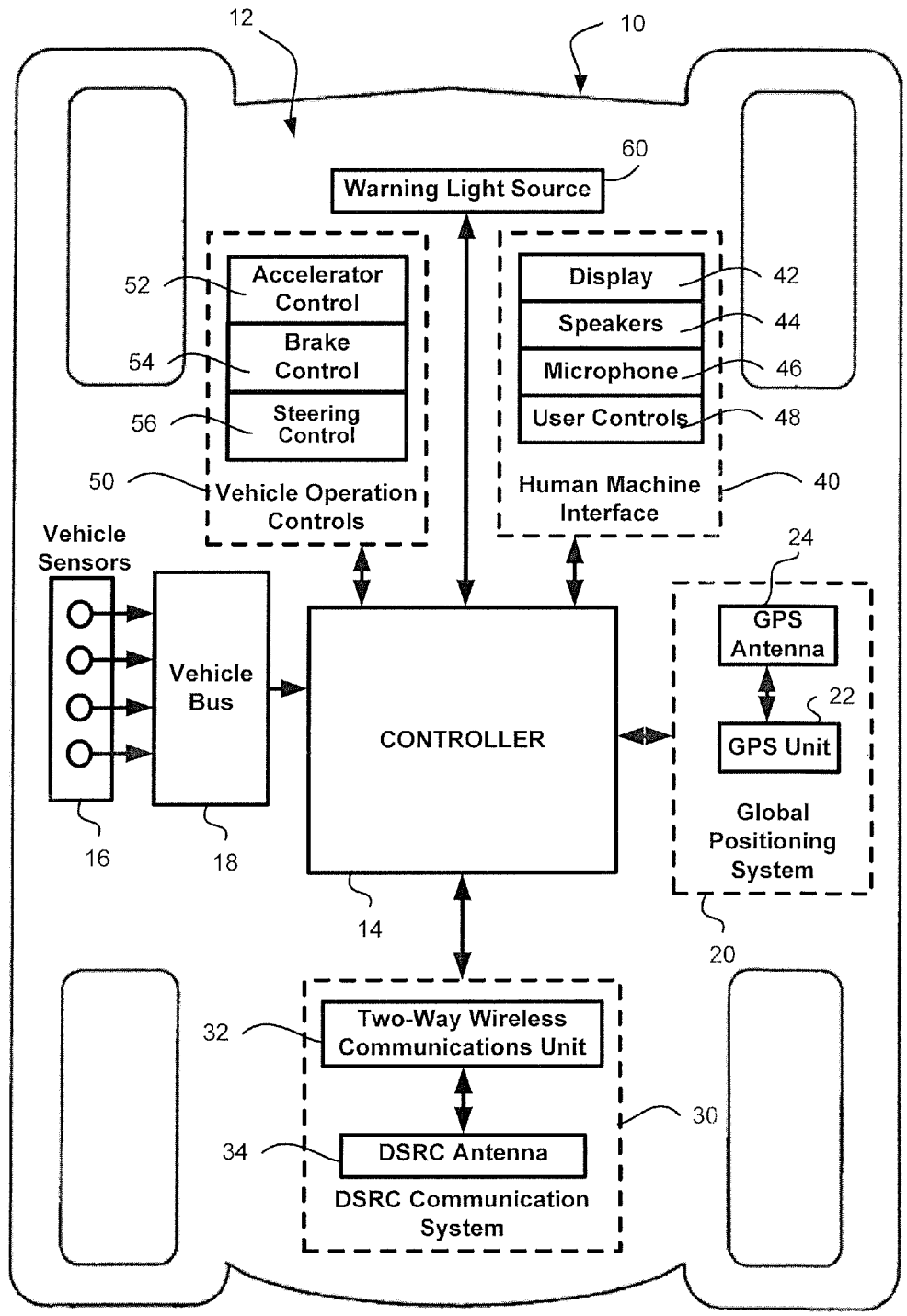
FIG. 2 is a schematic representation of a vehicle that is equipped with the on-board unit for conducting two-way wireless communications, as well as a vehicle collision warning system and vehicle meter cluster according to a disclosed embodiment.

Referring initially to FIGS. 1 and 2, a vehicle 10 can include a collision warning system 12. The vehicle 10 can be an automobile, truck, van, SUV or any other suitable type of vehicle. As understood in the art, the collision warning system 12 can include, for example, a controller 14 and a plurality of vehicle sensors 16 that communicate with the controller 14 via, for example, a vehicle bus 18.

The vehicle sensors 16 can be any suitable type of sensors, and can sense conditions in or surrounding the vehicle 10. For example, a vehicle sensor 16 can be a collision sensor that can sense the presence of objects proximate to the vehicle 10 in view of the speed of the vehicle 10, the direction of movement of the vehicle 10 (e.g., if the vehicle 10 is turning or changing lanes), or both, to determine whether a collision is possible in a manner as understood in the art. Also, the vehicle sensors 16 can sense characteristics of the vehicle 10, such as braking, steering, acceleration, and so on.

Upon receiving the signals from the vehicle sensors 16, the controller 14 can control the appropriate vehicle components based on the sensed information. As understood in the art, the controller 14 can include, for example, one or more microcomputers with a control program that controls and interacts with the application and components of the vehicle 10 as discussed herein. The controller 14 can also include other conventional components such as an input interface circuit, an output interface circuit, and storage devices such as a ROM (Read Only Memory) device and a RAM (Random Access Memory) device. The RAM and ROM store processing results and control programs that are run by the controller 14. The controller 14 can be operatively coupled to the components of the vehicle 10 in a conventional manner. It will be apparent to those skilled in the art from this disclosure that the precise structure and algorithms for the controller 14 can be any combination of hardware and software that will carry out the functions of the embodiments discussed herein.

As shown in more detail in FIG. 2, the vehicle 10 can include other components typically found on a vehicle, such as a global positioning system (GPS) 20. As understood in the art, the GPS 20 can include a GPS unit 22 and a GPS antenna 24. The GPS antenna 24 can, for example, receive GPS signals from GPS satellites 26 and, if appropriate, roadside units 28, which are shown in FIG. 1. The GPS unit 22 can therefore determine the location of the vehicle 10 based on the GPS signals in any suitable manner as understood in the art. As further shown, the GPS 20 communicates with the controller 14 in any suitable manner.

The vehicle 10 can also include a Digital Short Range Communication System (DSRC) 30. The DSRC 30 can include, for example, a two-way wireless communications unit 32 and a DSRC antenna 34. The two-way wireless communications unit 32 can wirelessly communicate with, for example, the roadside units 28, external servers 36 and other DSRCs 30 on other vehicles 10 via DSRC antenna 34. The DSRC 30 also communicates with the controller 14 in any suitable manner. Accordingly: the two-way wireless communications unit 32, the roadside units 28, the external servers 36 and the other DSRCs 30 can wirelessly exchange information with each other, such as information pertaining to conditions of the vehicle 10, information pertaining to conditions of the road 38 upon which the vehicle 10 is traveling, information pertaining to landmarks in the area (e.g., restaurants, service stations, lodging, points of interest, etc.) and so on.

Figure 3:
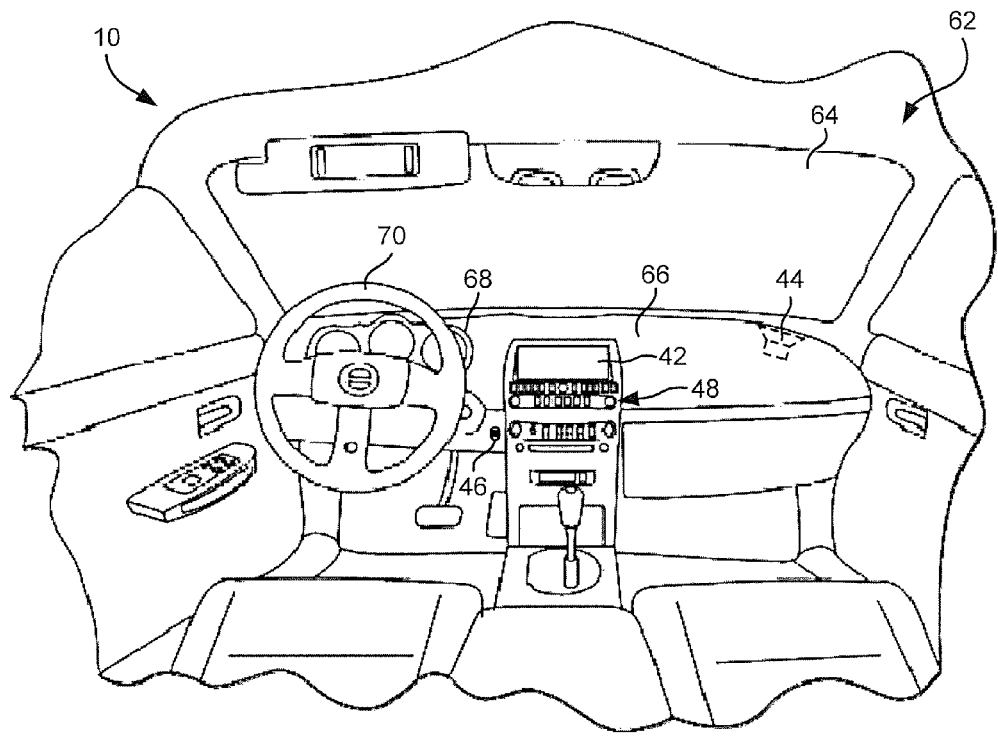
FIG. 3 is a perspective view of an example of the passenger compartment of the vehicle shown in FIGS. 1 and 2.

The vehicle 10 can further include components of a human machine interface 40 as understood in the art. For example, as shown in FIGS. 2 and 3, the human machine interface 40 can include at least one display 42, at least one speaker 44, at least one microphone 46 and at least one user control 48. The human machine interface 40 also communicates with the controller 14 in any suitable manner. The displays 42, speakers 44, microphones 46 and user controls 48 can enable a user, such as a driver or passenger, to control an entertainment system, control a navigation system, set features of the vehicle 10 (e.g., a clock, door chimes, lighting features, display features, and so on), perform hands-free telephony, and so on.

The vehicle 10 can further include other vehicle operation controls 50 typically found in a vehicle. These vehicle operation controls 50 can include, for example, an accelerator control 52 for controlling the acceleration operations of the vehicle 10, a brake control 54 for controlling the braking operations of the vehicle 10, a steering control 56 for controlling the steering operations of the vehicle 10, and so on. The vehicle operation controls 50 can communicate with the controller 14 in any suitable manner.

Figure 4:
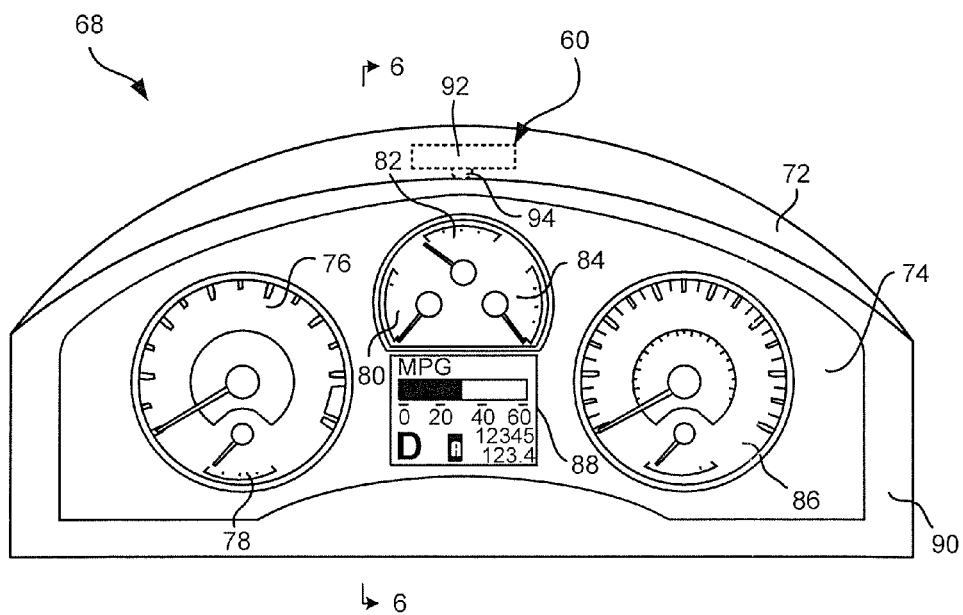
FIG. 4 is a detailed view of the vehicle meter cluster having a reflective display.
Figure 5:
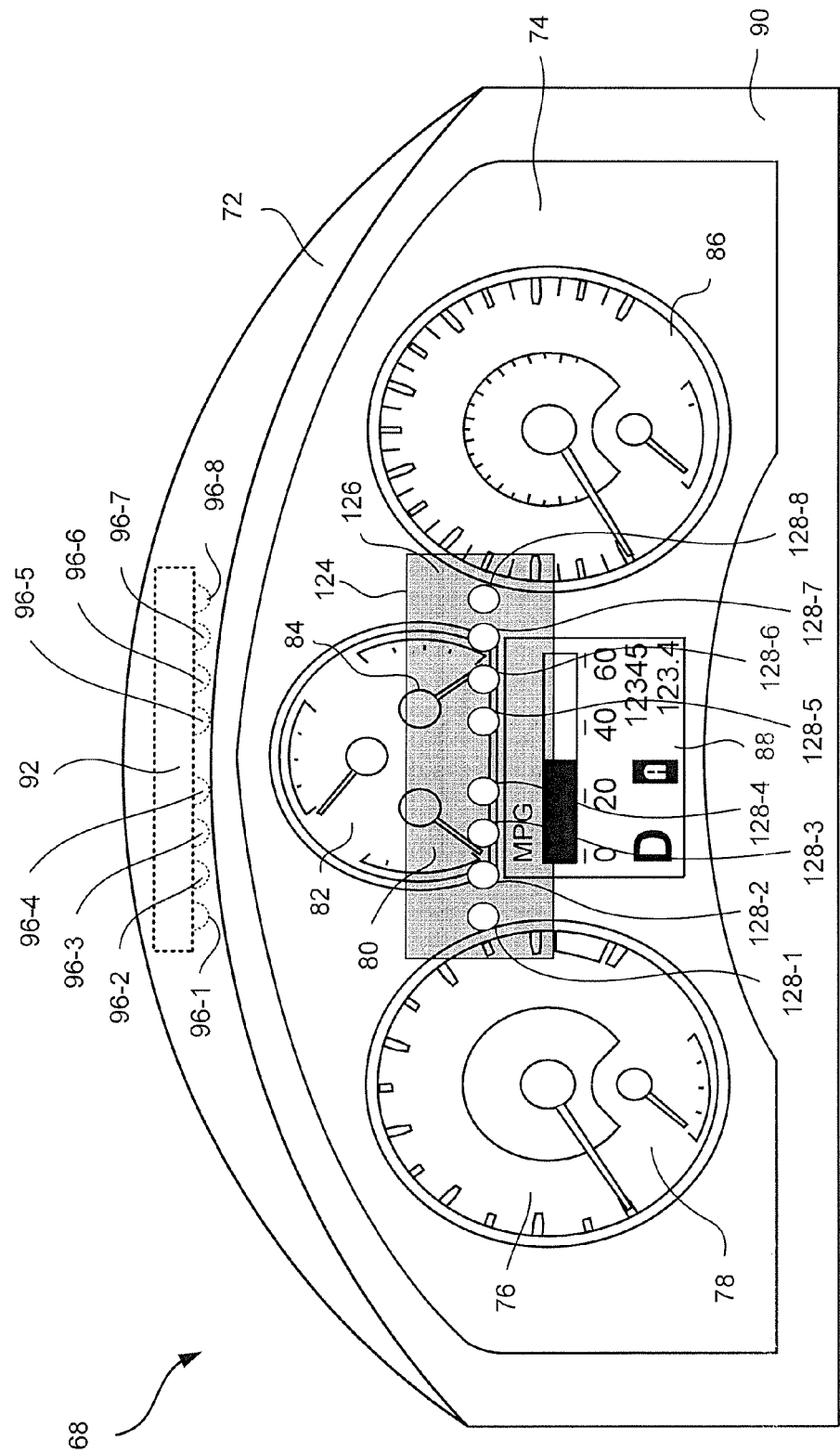
FIG. 5 is a detailed view of the vehicle meter cluster having the reflective display with an LED array as a light source for the reflective display.
Figure 6:
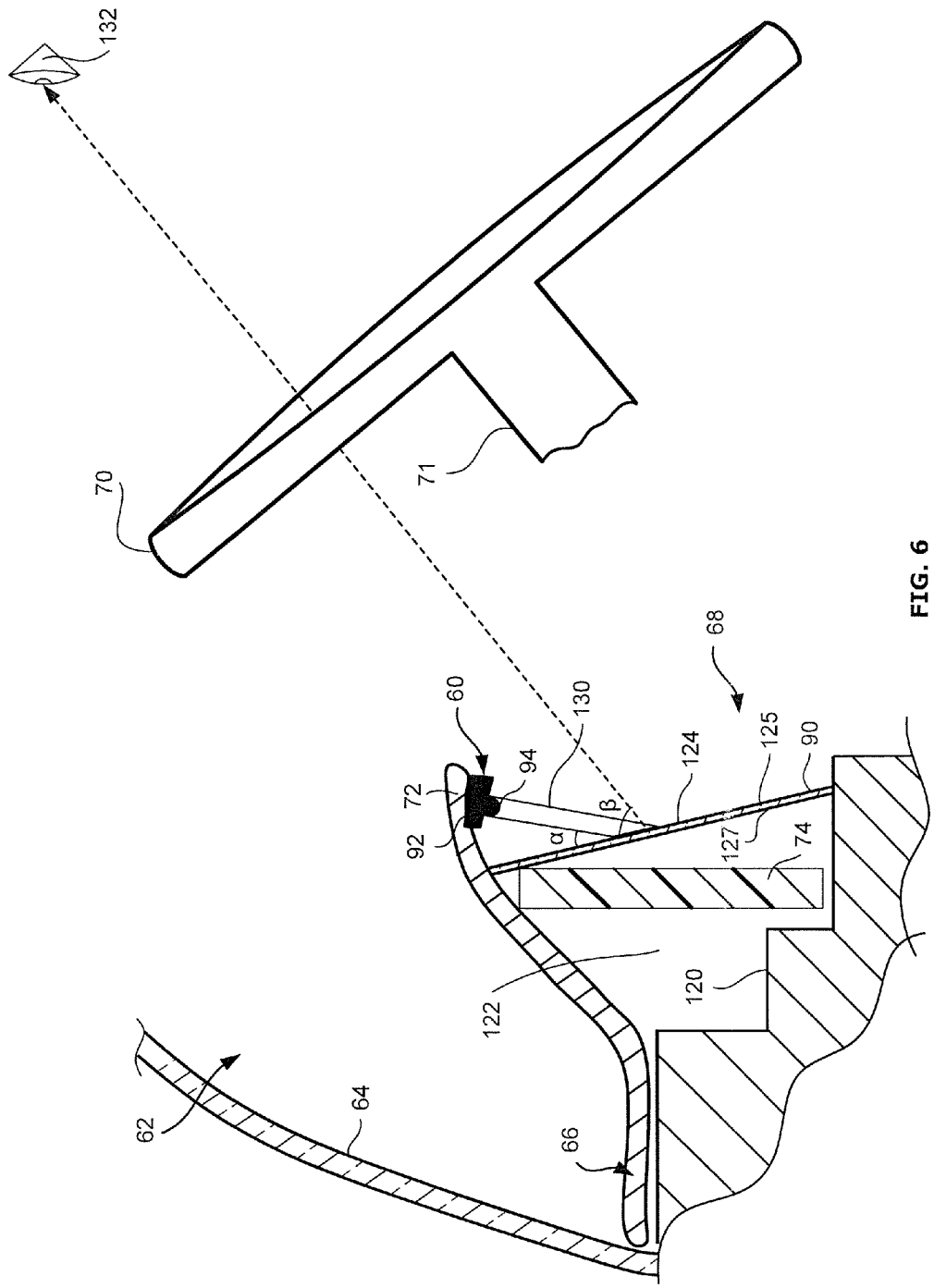
FIG. 6 is a cross-sectional view of the vehicle meter cluster shown in FIG. 5 illustrating an example of a meter lens, a meter lens reflective display, and reflection of light from the meter lens reflective display.

In addition, the vehicle 10 includes a warning light source 60, which can simply be referred to as a light source 60. The warning light source 60 is controlled by the controller 14 and will now be described in more detail. As shown in FIGS. 3 through 5, the vehicle 10 includes a passenger compartment 62, a windshield 64 and an instrument panel 66 as understood in the art. A meter cluster 68 can be present in the instrument panel 66 at a location that is readily viewable by the driver. Typically, the meter cluster 68 is disposed in front of the steering wheel 70.

The meter cluster 68 usually is disposed below a meter hood 72 that can be formed as part of the instrument panel 66 or secured to the instrument panel 66. The meter cluster 68 can include a meter panel 74, that can also be referred to as an instrument display. The meter panel 74 includes several gauges, such as a speedometer 76, a fuel gauge 78, an oil gauge 80, a battery gauge 82, a temperature gauge 84, and tachometer gauges 86, to name a few. The gauges can be controlled by the controller 14 or in any other suitable manner. The meter cluster 68 can also include a multi-information display 88. The multi-information display 88 can be controlled by the controller 14 and can be, for example, an LED display or LCD display that can be configured to present vehicle condition information. The multi-information display 88 can display information such as odometer information, trip information, fuel consumption information, outside temperature information and so on. The multi-information display 88 can also display warning information such as a low fuel warning, a flat tire warning and so on. In addition, a lens 90 covers the meter panel 74. The gauges discussed above and the various warning lights of a conventional meter panel, such as those included in meter panel 74, as well as the virtual gauges and other information that can be displayed on the multi-information display 88, can collectively be referred to herein as "instrumentation indicia." The lens 90 can be a transparent or semi-transparent panel that can be made of glass, plastic, or any other suitable transparent or semi-transparent material through which at least a portion of the visible light spectrum can pass. Also, at least a portion of the lens 90 can be non-refractive or substantially non-refractive, and the entirety of the lens 90 can be non-refractive or substantially non-refractive.

As further shown in FIGS. 5, 6, 10, and 11, the warning light source 60 can include a light source controller 92 that controls a light emitter unit 94, which can also simply be referred to as a light emitter. The light source controller 92 can communicate with the controller 14, and thus be controlled by the controller 14. In this example, the light emitter unit 94 includes a plurality of light emitting diodes 96-1 through 96-8, which can also be referred to collectively or individually simply as light emitting diode 96 or light emitting diodes 96.

Figure 7:
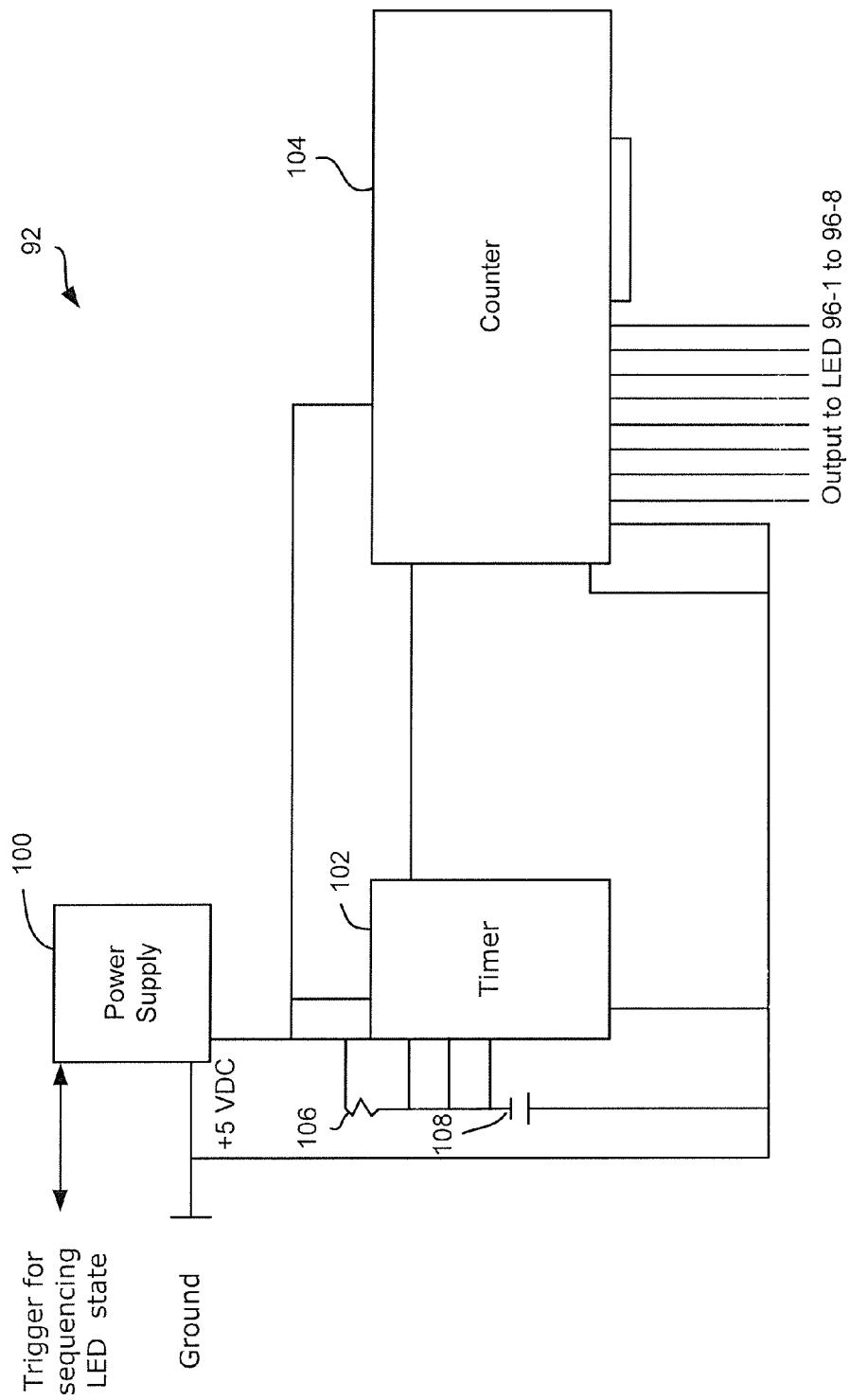
FIGS. 7 and 8 are exemplary schematics of a light source controller configured to control the light source of the vehicle meter cluster.
Figure 8:
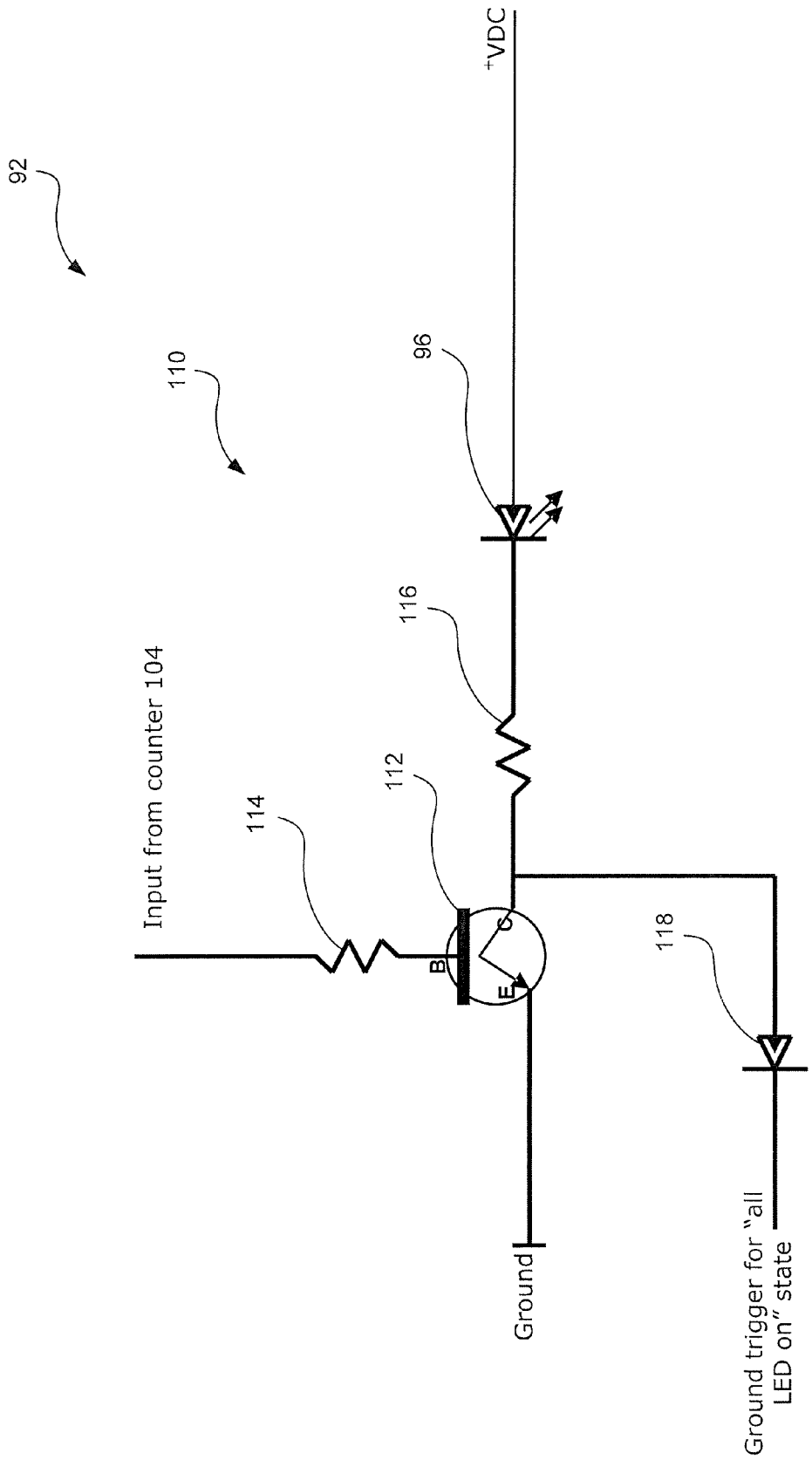

An example of components of the light source controller 92 is shown in FIGS. 7 and 8. The light source controller 92 can include, for example, a power supply 100, a timer 102 and a counter 104. The power supply 100 can be a voltage reducer that can function to reduce an input voltage of 12VDC from a vehicle battery to an output of 5VDC, for example. Naturally, the light source controller 92 can be configured to function without the need for a voltage reducer. The power supply 100 is further configured to receive an input trigger signal from, for example, the controller 14 to control lighting of the LEDs 96-1 to 96-8 in a sequenced manner as discussed in more detail below.

The output of the power supply 100 is provided to the timer 102 and the counter 104 as shown. As understood in the art, a variable resistor 106 and a variable capacitor 108 can be coupled to the timer 102 to adjust the frequency at which the timer operates. The frequency at which the timer operates determines the rate at which the counter 104 will cycle through its outputs as understood in the art. For example, each time the counter 106 receives a pulse from the timer 102, the counter 106 moves the output to the next output terminal.

That is, each of the output terminals is coupled to control lighting of a respective one of the LEDs 96-1 to 96-8. When the counter 104 receives a first pulse from the timer 102, the counter controls the output of the terminal coupled to LED 96-1 to light the LED 96-1 and controls the other output terminals to maintain the LEDS 96-2 to 96-8 in an off state. When the counter 104 receives the next pulse from the timer 102, the counter 104 controls the output terminal coupled to LED 96-1 to turn LED 96-1 off. The counter 104 also controls the output terminal coupled to LED 96-2 to turn LED 96-2 on. The counter 104 also controls the other output terminals to maintain the LEDS 96-1 and 96-3 to 96-8 in an off state.

An example of a driving circuit 110 of the light source controller 92 is shown in FIG. 8. In this example, a driving circuit 110 is associated with one respective LED 96. Accordingly, in this example, the light source controller 92 includes eight driving circuits 110 associated with the eight LEDs 96-1 to 96-8. The driving circuit 110 includes a transistor 112, a resistor 114, a variable resistor 116 and a diode 118 in this example. The transistor 112 can be a BJT type of transistor, or any other suitable type of transistor or switching device as understood in the art. In this example, the resistor 114 can be a 22 kΩ resistor, or can have any suitable resistance. The resistor 116 can be a variable resistor that drives the LED 96 and can have a resistance value suitable to drive the LED 96 depending on the particular characteristics of the LED, such as the forward turn-on voltage and drive current, as understood in the art. In this example, the cathode of the LED 96 is coupled to the collector of the transistor 112 via resistor 116 and the anode of LED 96 is coupled to a high input +VDC, such as +5 VDC or any other suitable voltage value. Also, each LED 96 can be installed in, for example, a polished polycarbonate lens or any other suitable material. Each LED 96 is then aimed at a particular location of the lens 90 to achieve the desired reflective pattern as understood in the art and discussed in more detail below.

As can be appreciated from FIG. 8, when the base of transistor 112 receives a high input from an output terminal of counter 104, the transistor 112 turns on and thus electrically couples the cathode of LED 96 to ground. Hence, LED 96 turns on. Accordingly, in the sequencing operation discussed above, when the transistor 112 of a driving circuit 110 receives a high input from the counter 104, that driving circuit 110 will turn on its associated LED 96. Conversely, when the transistor 112 receives a low input from an output terminal of counter 104, the driving circuit 110 will turn off its associated LED 96. Furthermore, as illustrated, the cathode of the diode 118 each driving circuit 110 can be coupled to a ground trigger that can be controlled by, for example, controller 14. Accordingly, when the controller 14, for example, sets the cathode of the diode 118 to a low or ground state, the diode 118 will electrically couple the cathode of LED 96 to ground and thus effectively bypass the transistor 112. By doing this, the controller 14 can light some or all of the diodes 96-1 to 96-8 simultaneously as discussed in more detail below.

Turning back to FIGS. 5 and 6, the meter cluster 68 includes a meter cluster housing 120 which can include the meter hood 72. As shown, the meter hood 72 extends over and past the lens 90 in a direction away from the meter panel 74 (instrument display). The meter cluster housing 120, in cooperation with the lens 90, defines a cavity 122 in which the meter panel 74 (instrument display) is disposed. In this example, the warning light source 60 is mounted on the meter hood 72. The light source 60 can be mounted on the undersurface of the hood 72 facing the lens 90, or it can be mounted within the hood 72 and shine through an aperture in the hood 72.

As further shown, the lens 90 includes a reflective surface 124 that includes a reflective display area 126, which can also be referred to simply as a reflective area 126. In this example, the reflective surface 124 includes at least a portion of an outer surface 125 of the lens 90. Hence, the reflective area 126 includes at least a portion of the outer surface 125 of the lens 90. The outer surface 125 of the lens 90 in this example is the surface of the lens 90 that faces outwardly away from the meter panel 74. Conversely, the inner surface 127 of the lens 90 in this example is the surface of the lens that faces inwardly toward the meter panel 74.

As discussed above, each LED 96-1 to 96-8 is aimed at a particular location of the lens 90 to achieve the desired reflective pattern. For example, as shown in FIG. 5, the light source 60 includes a plurality of LEDs 96-1 to 96-8 (light emitters) that are arranged in an array and configured to emit light onto respective locations of the reflective area 126 to produce respective LED reflections 128-1 to 128-8. Thus, the light emitted from the light source 60 can be shaped as an icon representing the warning information. It is also contemplated that the light source 60 can include an appliqué or template positioned between the light emitter 94 and the reflective area 126 so that the light emitted from the light source 60 is shaped as an icon representing the warning information. Moreover, the reflective area 126 should be at or about a central location on the lens 90 which is unobstructed by the steering wheel 70, the steering column 71, the driver's hands or any other vehicle component. In the example shown, the light can be seen by at least the driver through the openings in the steering wheel 70.

As discussed above, the multi-information display 88 includes at least one instrumentation indicia configured to present vehicle condition information. Thus, as shown, the light source 60 is configured to emit the light along a light path 130 toward the reflective display area 126 on the lens 90 that is positioned such that at least a majority of the instrumentation indicia displayed by the multi-information display 88 is visible through the lens 90 while the light source 60 is emitting the light toward the reflective display area 126. In other words, the reflective display area 126 is positioned to overlap at least some of the instrumentation indicia along the lens 90. Alternatively, the reflective display area is entirely spaced away from the instrumentation indicia along the lens.

It should also be noted that the meter panel 74 can include, for example, an LCD display. In this type of arrangement, the meter panel 74 can be the liquid crystal layer, and the lens 90 can be the cover layer. Thus, the light source 60 can emit the LED light directly onto the cover layer (lens 90) and the LED light is reflected from the lens 90 covering the liquid crystal layer.

The light source 60 emits light along a light path 130. As can be appreciated from FIG. 6, the light path 130 propagates in a direction that forms a light path angle α with respect to the reflective display surface 124. In this example, the light path angle α is an acute angle with respect to the reflective surface 124 of the lens 90. The LED reflections 128-1 to 128-8 appear to the driver or passenger as being present at the lens 90 and thus, in front of the meter panel 74. It should be further noted that the lens 90 is angled with respect to the meter cluster housing 120 and, in particular, with respect to the meter panel 74, to direct the light from the LED reflections 128-1 to 128-8 in a general direction toward the eyes 132 of the driver. For illustrative purposes, the light from the LED reflections 128-1 to 128-8 is shown as being reflected from the reflective display area 126 along a reflection path that forms a second acute angle (β with respect to the reflective display area 126 and, in particular, with respect to the reflective surface 124. However, in actuality, the light from the LED reflections 128-1 to 128-8 emanates from the reflective display area 126 in a scattered manner as would be understood by one skilled in the art. As discussed above, in this example, the reflected light is shown as being visible to at least the driver through openings in the steering wheel 70.

Thus, the LED reflections 128-1 to 128-8 can readily be perceived by the driver and possibly some of the passengers. Furthermore, as discussed above, the hood 72 is configured to extend past the lens 90 to block light propagating in a direction toward the lens 90 from behind the hood 72 and cast a shadow across a portion of the lens 90 that includes the reflective area 126. In any event, the reflected LED light is distinguishable from the other meter cluster information. The warning information stands out and can mask the other meter cluster information. Hence, although the other information may still be observable, the warning information is prominent. Preferably, the driver only sees light from the reflection on the lens 90, not directly from the light source 60.

Accordingly, as can be appreciated from the above, the controller 14 can control the light source 60 to selectively emit light toward the reflective area 126 of the lens 90 to selectively provide warning information on the reflective area 126. For example, as discussed above, the controller 14 can include a collision detection component that is configured to detect whether a potential for collision exists between the vehicle 10 and an object. The controller 14 can provide a potential collision detection signal to the light source controller 92 based on the detection to control the light source 60. The potential collision detection signal represents at least one warning of a plurality of warnings. Thus, the light source controller 92 controls the light source 60 to emit the light in a manner to indicate the warning represented by the potential collision detection signal. In other words, the light source controller 92 can selectively activate the light source 60 to emit the light toward the reflective area 126 of the lens 90 based on the potential collision detection signal.

Figure 9:
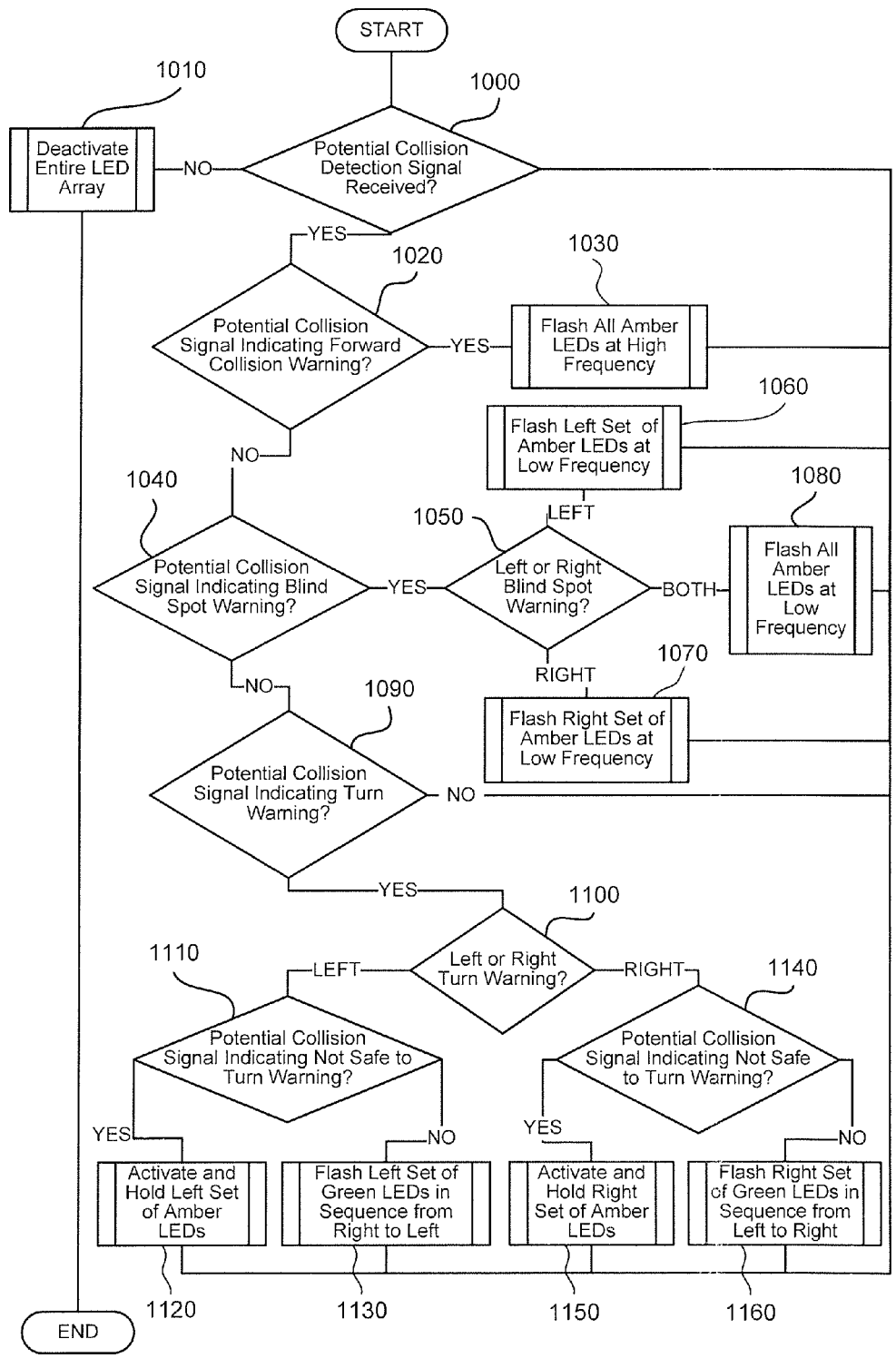
FIG. 9 is a flowchart illustrating an example of operations that can be performed to control the light source as discussed herein.

For example, the controller 14 can control the light source controller 92 to operate the counter 104 selectively emit light in a predetermined sequence that represents the warning information toward the reflective area 126 of the lens 90. As shown in FIG. 9, the controller 14 can determine in step 1000 whether the vehicle 10 may experience a potential collision based on, for example, signals from the vehicle sensors 16, information from the GPS 20, messages received through the DSRC system 30 and so on. If the controller 14 determines that there is no current potential for a collision, the processing can continue to step 1010. In step 1010, the controller 14 can control the light source controller 92 to deactivate the light source 60. Thus, all LEDs 96-1 to 96-8 can be deactivated. The processing can then end and repeat at step 1000 continuously while the controller 14 is monitoring the signals from the vehicle sensors 16, information from the GPS 20, messages received through the DSRC system 30 and so on.

However, when the processing determines in step 1000 that there is a potential for a collision, the processing continues to step 1020. In step 1020, the processing can determine whether the vehicle 10 can potentially experience a forward collision. If the processing determines that the vehicle 10 can potentially experience a forward collision, the potential collision detection signal indicates a forward collision warning that the vehicle 10 can potentially experience a forward collision. In this event, the processing can continue to step 1030. During step 1030, the light source controller 92 can control the light source 60 to light the entire array of LEDs 96-1 to 96-8 (light emitters). In this example, amber LEDs 96-1 to 96-8 or the amber component of multi-colored LEDs 96-1 to 96-8 can be lit. Naturally, the LEDs 96-1 to 96-8 can have any suitable color, such as red. The processing then can repeat at step 1000 continuously while the controller is monitoring signals from the vehicle sensors 16, information from the GPS 20 and so on.

However, if the processing determines in step 1020 that there is no current possibility for a forward collision, the processing can continue to step 1040. The controller 14 can thus determine in step 1040 whether a blind spot warning should be given. That is, the processing can determine in step 1050 whether the blind spot is on the left side or the right side of the vehicle 10, or on both the left and right sides of the vehicle 10. As can be appreciated from FIG. 5, the plurality of LEDs 96-1 to 96-8 (light emitters) are arranged in an array, with the LEDs 96-1 to 96-8 divided into a left side group (LEDs 96-1 to 96-4) and a right side group (LEDs 96-5 to 96-8). Thus, the light source controller 92 can control the light source to light one of the left side group or right side group of LEDs 96 (light emitters) when the potential collision detection signal indicates a blind spot warning on a corresponding left or right side of the vehicle 10. For example, the controller 14 can determine a driver indication of intent to move the vehicle toward the obstacle (e.g. turn signal, yaw moment) based on signals from the vehicle sensors 16. Moreover, the controller 14 can control the light source controller 92 to flash the LEDs 96-1 to 96-8 in succession toward the obstacle. Also, the controller 14 can control additional light sources in, for example, an A-pillar trim, a mirror bezel, or another part of the instrument panel 66.

Accordingly, if the processing determines in step 1050 that the blind spot is on the left side of the vehicle 10, the processing continues to step 1060. During step 1060, the controller 14 can control the light source controller 92 to flash the left side group (LEDs 96-1 to 96-4) with a warning color (e.g., amber or red) at a low frequency. However, if the processing determines in step 1050 that the blind spot is on the right side of the vehicle 10, the processing continues to step 1070. During step 1070, the controller 14 can control the light source controller 92 to flash the right side group (LEDs 96-5 to 96-8) with a warning color (e.g., amber or red) at a low frequency. Also, if the processing determines in step 1050 that the blind spot is on both the left and right sides of the vehicle 10, the processing continues to step 1080. During step 1080, the controller 14 can control the light source controller 92 to flash the all of the LEDs 96-1 to 96-8 with a warning color (e.g., amber or red) at a low frequency. Alternatively, instead of a right side group and a left side group of LEDs, a single LED could be activated or flashed in correspondence with the blind spot warning, such as LED 96-1 for the left side and LED 96-8 for the right side. After completing steps 1060, 1070 or 1080, the processing can repeat at step 1000 continuously while the controller is monitoring signals from the vehicle sensors 16, information from the GPS 20 and so on.

However, if the processing determines in step 1040 that there is no current potential blind spot, the processing can continue to step 1090. In step 1090, the controller 14 can determine based on, for example, signals from the vehicle sensors 16, information from the GPS 20 and so on, when a turn is expected and the vehicle 12 is approaching in a lane to be crossed. If the processing determines that there is no current turning operation being performed, the processing can repeat at step 1000 continuously while the controller is monitoring signals from the vehicle sensors 16, information from the GPS 20 and so on. On the contrary, if the processing determines in step 1090 that the vehicle 10 is about to execute a turn, the processing determines in step 1100 whether the vehicle 10 is turning left or right. The controller 14 can thus control the light source controller 92 to control the light source 60 to light the array of LEDs 96 (light emitters) in sequence or succession toward an intended turn direction of the vehicle 10 when the potential collision detection signal indicates clearance for the vehicle to turn in the intended turn direction.

For example, if the processing determines in step 1100 that the vehicle 10 is turning left, the processing determines in step 1110 whether the vehicle 10 can experience a potential collision based on signals from the vehicle sensors 16, information from the GPS 20, messages received through the DSRC system 30 and so on. If the vehicle 10 can experience a potential collision, the light source controller 92 can control the light source 60 in step 1120 to activate the array of LEDs 96 (light emitters) continuously or in a flashing manner to emit a warning color (e.g., amber or red) when the potential collision detection signal indicates a turn hazard warning pertaining to the intended turn direction. Alternatively, if the processing determines in step 1110 that the vehicle 10 can turn without a potential collision, the light source controller 92 can control the light source 60 in step 1130 to activate the array of LEDs 96 (light emitters) to emit (continuously or flashing) a safe color (e.g., green) when the vehicle 10 can safely turn left. Also, as discussed above, the LEDs 96 can be multi-colored LEDs. Hence, the light emitted by the LEDs 96 (light emitters) can be a first color (e.g., green) when the potential collision detection signal indicates clearance to turn and a second color (e.g., amber or red) when potential collision detection signal indicates a turn hazard warning. Alternatively, some of the LEDs 96 can be of one color and the other of the LEDs 96 can be of another color.

Similarly, if the processing determines in step 1100 that the vehicle 10 is turning right, the processing determines in step 1140 whether the vehicle 10 can experience a potential collision based on signals from the vehicle sensors 16, information from the GPS 20, messages received through the DSRC system 30 and so on. If the vehicle 10 can experience a potential collision, the light source controller 92 can control the light source 60 in step 1150 to activate the array of LEDs 96 (light emitters) continuously or in a flashing manner to emit a warning color (e.g., amber or red) when the potential collision detection signal indicates a turn hazard warning pertaining to the intended turn direction. Alternatively, if the processing determines in step 1140 that the vehicle 10 can turn without a potential collision, the light source controller 92 can control the light source 60 in step 1160 to activate the array of LEDs 96 (light emitters) to emit (continuously or flashing) a safe color (e.g., green) when the vehicle 10 can safely turn right. Upon completing steps 1120, 1130, 1150 or 1160, the processing can repeat at step 1000 continuously while the controller 14 is monitoring signals from the vehicle sensors 16, information from the GPS 20, messages received through the DSRC system 30 and so on.

It should also be noted that the light source 60 can be disposed at other locations on the hood 72, as well as at other locations on the meter cluster housing 120. For instance, the light source 60 can be disposed below the lens 90. Alternatively, the light source 90 can be disposed on a component of the vehicle 10, such as on the instrument panel 66 or on a steering column 71 located between the steering wheel 70 and the lens 90, at a location proximate to the meter cluster housing 120. Specifically, a vehicle component, such as the hood 72, is configured to block light from the LEDs 96, as well as reflected LED light from the reflective area 126, so that the light from the LEDs 96 and the reflected LED light from the reflective area 126 is not visible outside the vehicle 10 through a viewing aperture in the vehicle 10, such as the windshield 64 or other windows. The light source 60 is allowed to emit brighter light than HUD light sources, since the light from the light source 60 and reflected from the reflective area 126 will not be viewable through viewing apertures of the vehicle as it would be in an HUD system, thereby eliminating concerns about the brightness of light that is viewable through the viewing apertures. Additionally, the shadow cast across the reflective area 126 by the hood 72 will cause the reflected light from the reflective area 126 to appear brighter than if there were no shadow cast on the reflective area 126. Thus, the light reflected from the reflective area 126 will be easier for the driver to perceive, even while wearing polarizing sunglasses. Furthermore, the light source 60 can include one or more LEDs as discussed above. Alternatively or in addition to the LEDs, the light source 60 can include an LCD display, or a laser projector that can be mounted on the meter hood 72 to point at the reflective area 126 of the lens.

Figure 10:
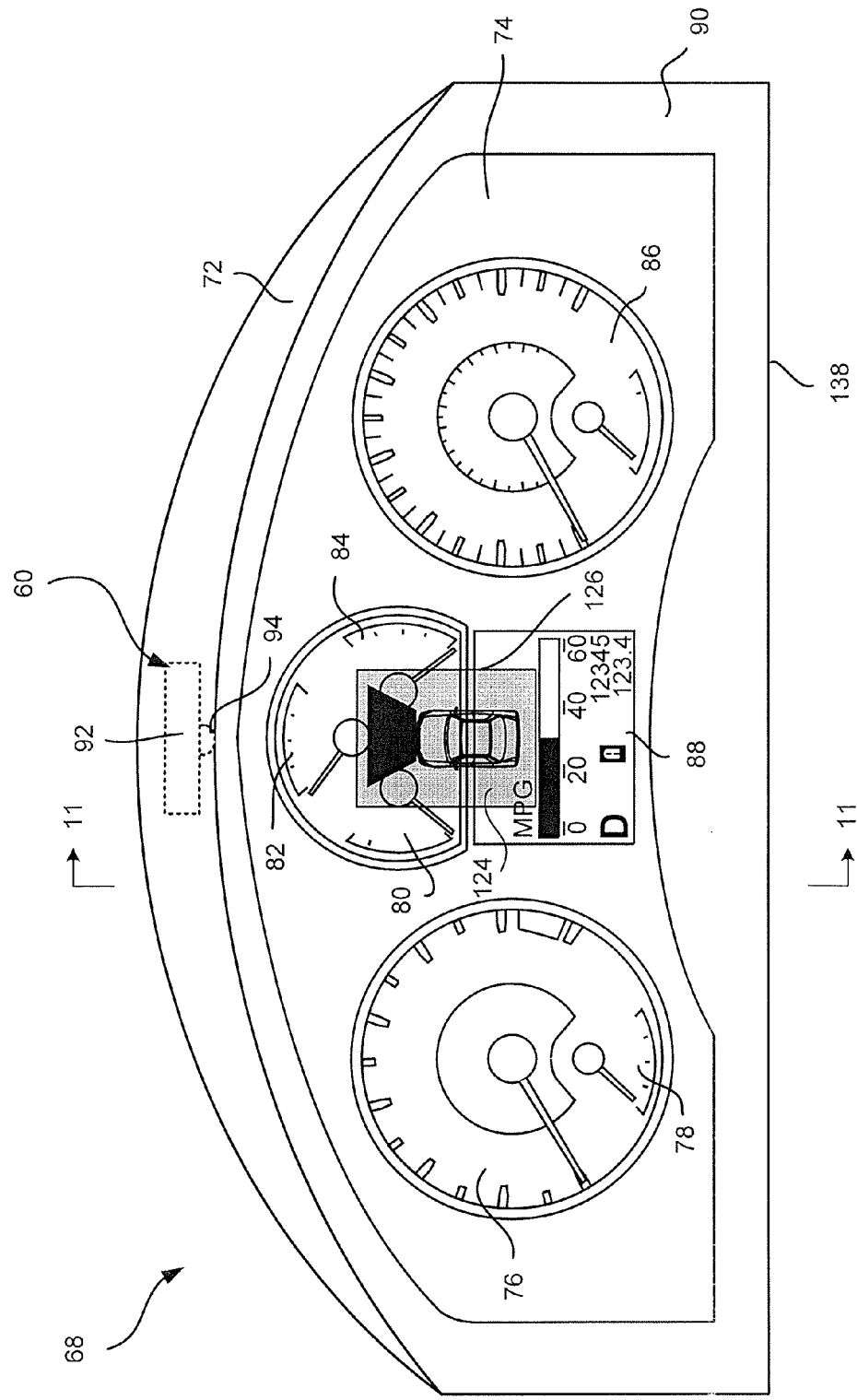
FIG. 10 is a detailed view of the vehicle meter cluster having an alternative configuration for the reflective display and the light source.
Figure 11:
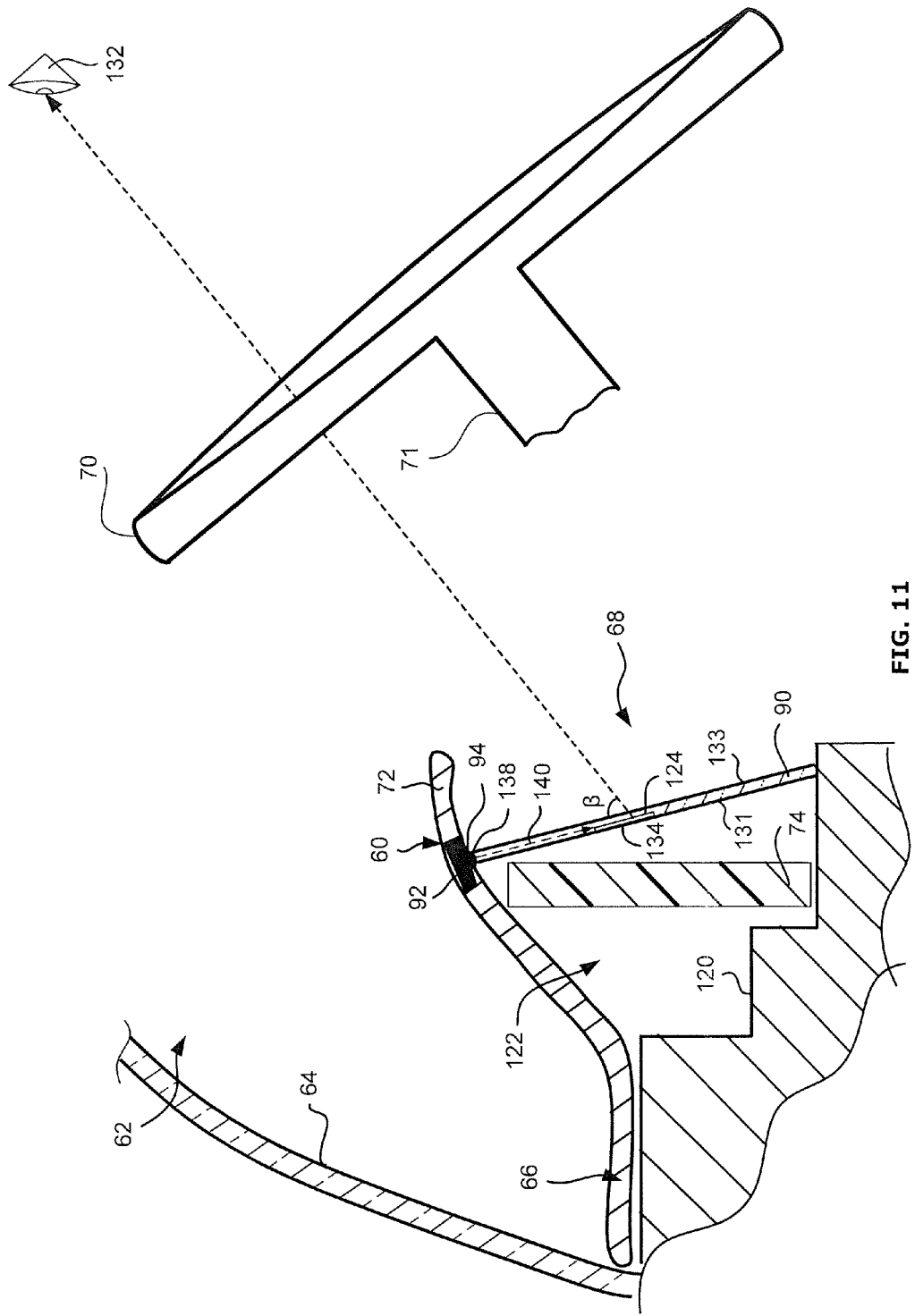
FIG. 11 is a cross-sectional view of the vehicle meter cluster shown in FIG. 10 illustrating an example of a meter cluster, a meter lens, meter lens reflective display, and reflection of the light from the meter lens reflective display.

In addition, as shown in FIGS. 10 and 11, the lens 90 can include a first surface 131 which is shown as an inside surface, and a second surface 133 which is shown as an outside surface and opposite to the first (inside) surface 131. The first surface 131 has at least one etching 134 including the reflective area 126 that can be shaped as an icon representing the warning information. In this example, the first surface 131 is shown as the inside surface which faces the meter panel 74. However, the second (outside) surface 133 can include the etching 134 and act as the first surface. The lens 90 further includes a peripheral edge 138 surrounding the first surface and the second surface. The light source 60 is directed toward the peripheral edge 138 to selectively emit the light to propagate along a light path 140 in the lens 90 in a longitudinal direction of the lens 90 onto the reflective area 126 as shown in FIG. 11. As in the example discussed above with regard to FIGS. 5 and 6, the reflective area 126 should be at or about a central location on the lens 90 which is unobstructed by the steering wheel 70, the steering column 71, the driver's hands or any other vehicle component. In the example shown, the light can be seen through the openings in the steering wheel 70.

Accordingly, the systems described above present a visual warning that conspicuously stands out as a warning within the driver's field of vision without being perceivable externally of the vehicle 10, thus complying with vehicle regulations. The systems can be configured into existing packaging space which is unobtrusive, and does not interfere with other vehicle components such as trim panels, airbags and so on. Also, the light source 60 discussed above is static and strategically placed among the other meter cluster information. However, the light source 60 can be adjustable based on driver's eye position, seat position, the potential collision detection signal, the warnings, and so on.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle meter cluster. Accordingly, these terms, as utilized to describe the present invention should be interpreted relative to a vehicle equipped with the vehicle meter cluster.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:
   a meter cluster including:
      a meter cluster housing;
      an instrument display including at least one instrumentation indicia configured to present vehicle condition information;
      a light source;
      a lens positioned between the instrument display and the light source, the lens having a first surface facing the instrument display and a second surface opposite the first surface and facing the light source, the second surface including a reflective display area, the instrument display being visible through the lens, the light source being configured to selectively emit light toward the reflective display area of the lens to selectively provide warning information on the reflective display area, the warning information being different than the vehicle condition information, and the reflective display area being positioned to at least partially overlay the instrumentation indicia such that the instrumentation indicia is at least partially visible through the lens while the light source is emitting the light toward the reflective display area; and
      a controller configured to selectively activate the light source to emit the light; and
   a collision detection component configured to detect whether a potential for collision exists between the vehicle and an object, and to provide a potential collision detection signal based on the detection, the controller being configured to selectively activate the light source to emit the light based on the potential collision detection signal.

2. The vehicle according to claim 1, wherein
the light source includes at least one light emitter.

3. The vehicle according to claim 2, wherein
the light source includes a plurality of light emitters arranged in an array, and is configured to selectively emit light from the light emitters in a predetermined sequence that represents the warning information.

4. The vehicle according to claim 1, wherein
the light emitted from the light source is shaped as an icon representing the warning information.

5. The vehicle according to claim 1, wherein
at least a majority of the at least one instrumentation indicia is visible through the lens while the light source is emitting the light toward the reflective display area.

6. The vehicle according to claim 5, wherein
at least a portion of the at least one instrumentation indicia is visible through the reflective display area.

7. The vehicle according to claim 5, wherein
the reflective display area is entirely spaced away from the instrumentation indicia along the lens such that the at least one instrumentation indicia is entirely visible through the lens.

8. The vehicle according to claim 1, wherein
the meter cluster housing includes a hood that is configured to extend over and past the lens to block light propagating in a direction toward the lens from behind the hood and cast a shadow across the reflective display area.

9. The vehicle according to claim 1, wherein
the meter cluster housing includes a hood extending over and past the lens in a direction away from the instrument display; and
the meter cluster housing, in cooperation with the lens, defines a cavity in which the instrument display is disposed.

10. The vehicle according to claim 1, wherein
the meter cluster housing includes a hood extending over and past the lens in a direction away from the instrument display; and
the light source is mounted on the hood.

11. The vehicle according to claim 10, wherein
the light source is mounted on the hood to selectively emit the light toward the reflective display area at a first angle with respect to the second surface of the lens, the first angle being less than a second angle between the second surface and a reflection path at which a reflected portion of the light propagates from the second surface.

12. The vehicle according to claim 1, wherein at least a portion of the lens is non-refractive.

13. The vehicle according to claim 1, wherein
the collision detection component provides the potential collision detection signal based on at least one warning of a plurality of warnings, and the controller is configured to control the light source to emit the light in a manner to indicate the at least one warning represented by the potential collision detection signal.

14. The vehicle according to claim 13, wherein
the plurality of warnings includes a forward collision warning;
the light source includes a plurality of light emitters arranged in an array; and
the controller is configured to control the light source to light the entire array of light emitters when the potential collision detection signal indicates the forward collision warning.

15. The vehicle according to claim 1, wherein
the light source includes a plurality of groups of light sources; and
the collision detection component provides the potential collision detection signal based on at least one warning of a plurality of warnings, and the controller is configured to control the groups of light sources to emit the light differently according to the plurality of warnings.

16. The vehicle according to claim 13, wherein the plurality of warnings includes a left side blind spot warning and a right side blind spot warning.

17. The vehicle according to claim 13, wherein the plurality of warnings includes a clearance and a turn hazard warning.

18. The vehicle according to claim 17, wherein the controller is configured to control the array of the light emitters to emit a first color when the potential collision detection signal indicates the clearance and a second color when the potential collision detection signal indicates the turn hazard warning.

19. A vehicle comprising:
a vehicle collision warning system including:
   a collision detection component configured to detect whether a potential for collision exists between the vehicle and an object, and to provide a potential collision detection signal based on the detection which includes at least one warning of a plurality of warnings, the plurality of warnings including a left side blind spot warning and a right side blind spot warning;
   a meter cluster including:
      a meter cluster housing;
      an instrument display;
      a light source including a plurality of light emitters arranged in an array, with the array of light emitters divided into a left side group and a right side group;
      a lens positioned between the instrument display and the light source, the lens having a first surface facing the instrument display and a second surface opposite the first surface and facing the light source, the second surface including a reflective display area, the instrument display being visible through the lens, and the light source being configured to selectively emit light toward the reflective display area of the lens; and
   a controller configured to selectively activate the light source to emit the light based on the potential collision detection signal in a manner to indicate the at least one warning represented by the potential collision detection signal, such that the controller is configured to control the light source to light the left side group when the potential collision detection signal indicates a left side blind spot warning, and the controller is configured to control the light source to light the right side group when the potential collision detection signal indicates a right side blind spot warning.

20. A vehicle comprising:
a vehicle collision warning system including:
   a collision detection component configured to detect whether a potential for collision exists between the vehicle and an object, and to provide a potential collision detection signal based on the detection which includes at least one warning of a plurality of warnings, the plurality of warnings including a clearance and a turn hazard warning;
   a meter cluster including:
      a meter cluster housing;
      an instrument display;
      a light source including a plurality of light emitters arranged in an array;
      a lens positioned between the instrument display and the light source, the lens having a first surface facing the instrument display and a second surface opposite the first surface and facing the light source, the second surface including a reflective display area, the instrument display being visible through the lens, and the light source being configured to selectively emit light toward the reflective display area of the lens; and
   a controller configured to selectively activate the light source to emit the light based on the potential collision detection signal in a manner to indicate the at least one warning represented by the potential collision detection signal, such that the controller is configured to detect an intended turn direction and control the light source to light the array of light emitters in sequence toward the intended turn direction when the potential collision detection signal indicates the clearance, and to flash the array of light emitters when the potential collision detection signal indicates the turn hazard warning.

21. The vehicle according to claim 20, wherein the controller is configured to control the array of the light emitters to emit a first color when the potential collision detection signal indicates the clearance and a second color when the potential collision detection signal indicates the turn hazard warning.

* * * * *